April 6, 1954
C. G. MINOR
2,674,511
REFRIGERATOR HAVING A TILTABLE COMPARTMENT
Original Filed Aug. 3, 1946
3 Sheets-Sheet 1
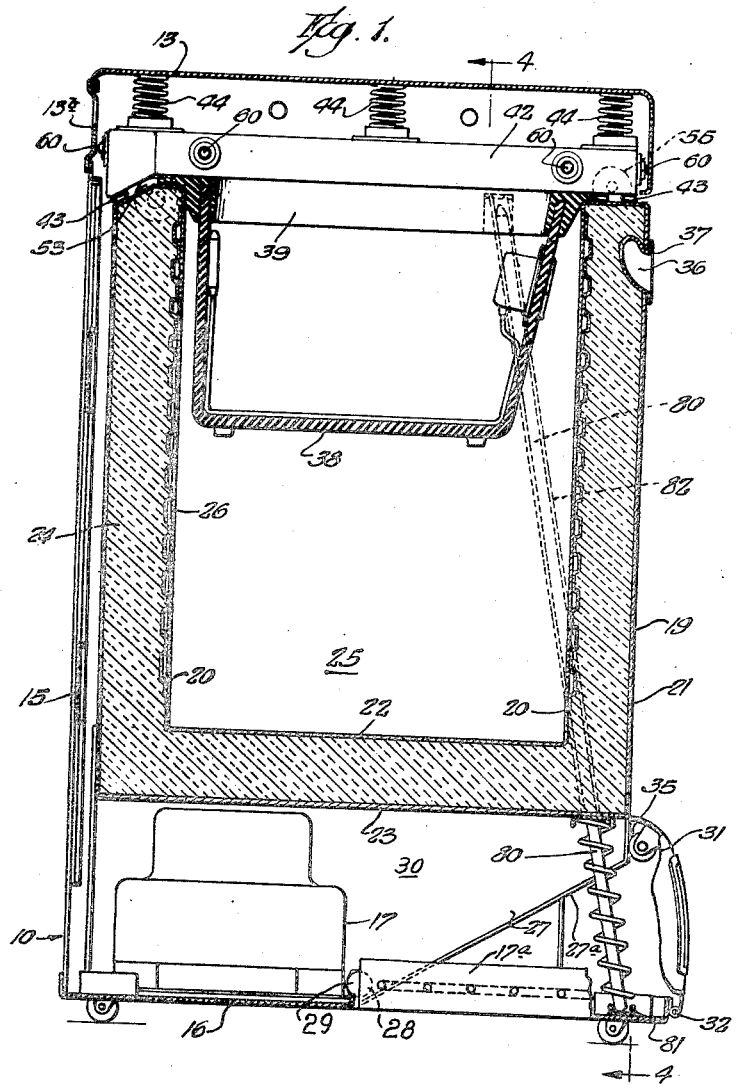
INVENTOR.
Charles G. Minor
BY H. Thrall Brewer
Atty

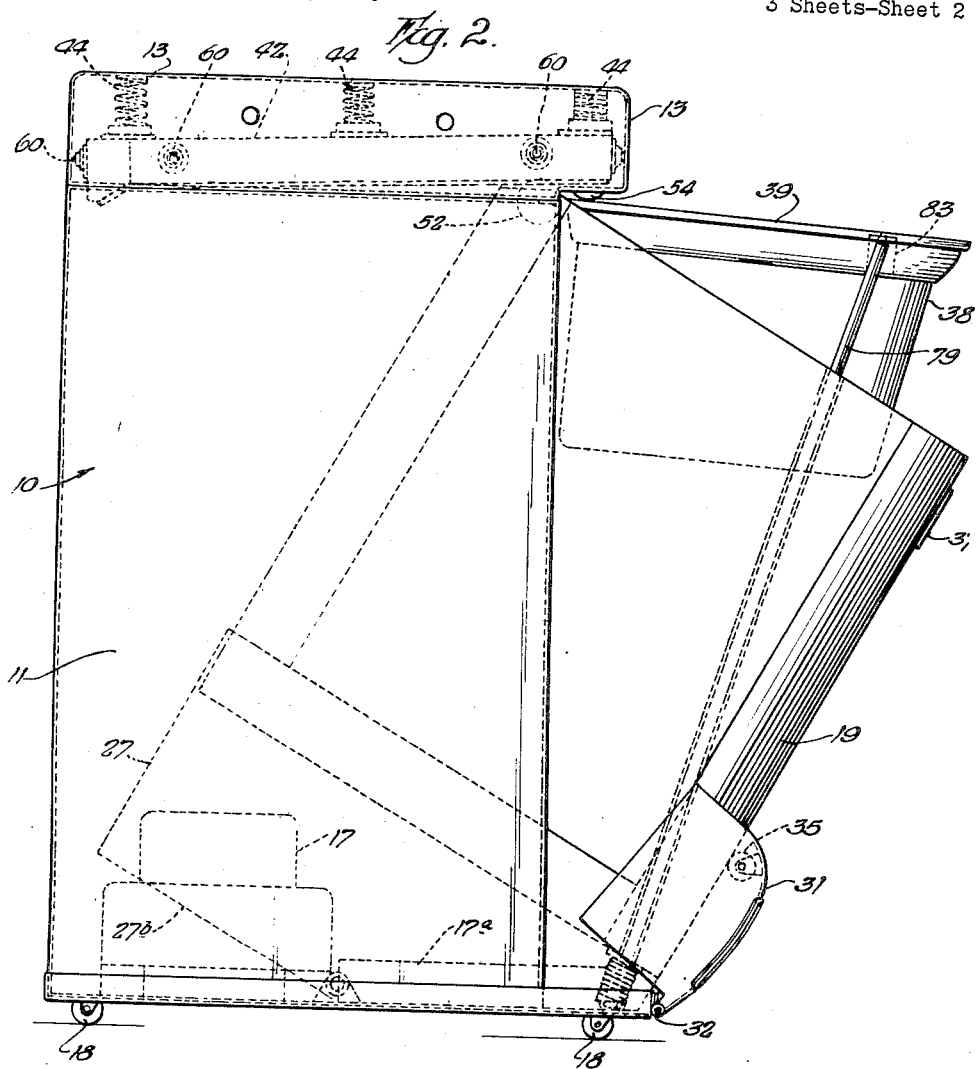

April 6, 1954     C. G. MINOR     2,674,511
REFRIGERATOR HAVING A TILTABLE COMPARTMENT
Original Filed Aug. 3, 1946     3 Sheets-Sheet 3
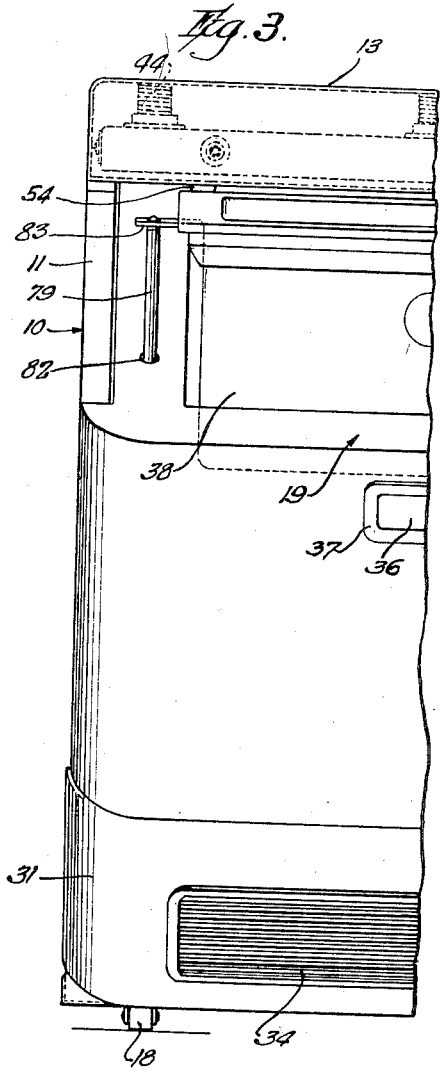
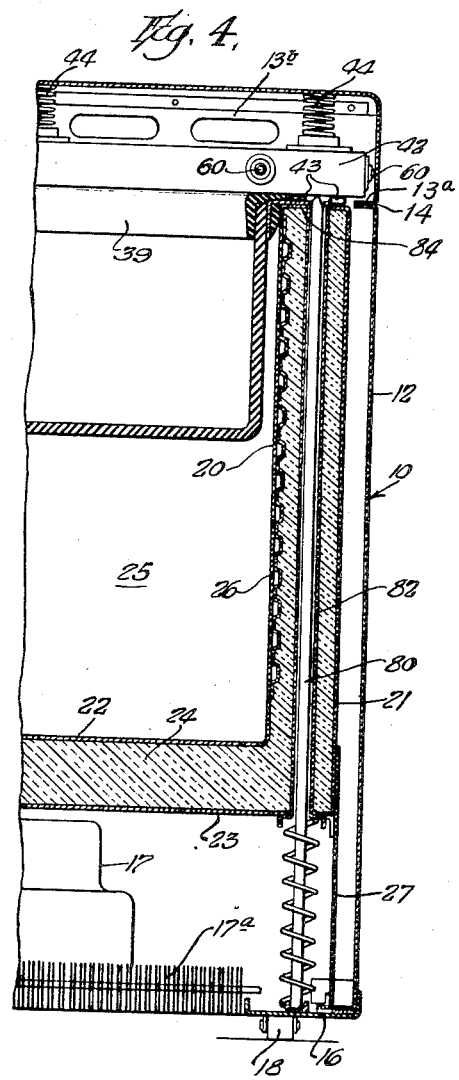
INVENTOR.
Charles G. Minor
BY H. Thrall Brewer
Atty Patented Apr. 6, 1954

2,674,511

UNITED STATES PATENT OFFICE 2,674,511

REFRIGERATOR HAVING A TILTABLE COMPARTMENT

Charles G. Minor, Evanston, Ill., assignor of one-half to Albert G. McCaleb, Evanston, Ill.; Harry H. Gmeiner, executor of said Charles G. Minor, deceased; Ruth F. McCaleb, executrix of said Albert G. McCaleb, deceased Original application August 3, 1946, Serial No. 688,372. Divided and this application April 16, 1949, Serial No. 87,906

3 Claims. (Cl. 312—269)

This invention relates to mechanical refrigerators and has to do more especially with refrigerators designed for domestic use.

The subject matter of this application is in some respects closely related to that of my co-pending application Serial No. 649,240, filed February 21, 1946, now U. S. Patent No. 2,537,363, and reference may be had to said application for a more detailed description than is herein set forth of such features as are common to the two cases. This application is also a division of my copending application Serial No. 688,372, for Refrigerators, filed August 3, 1946, and which has now issued as Patent No. 2,490,535.

One of the objects of the present invention, in common with that of my above identified copending application, is to provide a domestic mechanical refrigerator in which the food storage chamber is tiltable, as a unit, out of the cabinet in which it is housed to afford convenient access to the interior from the top thereof while leaving the upper surface of the cabinet or housing undisturbed, so that it is conveniently usable as a shelf or table on which to place dishes and articles of food during the process of putting and taking such articles into and out of the food compartments.

Another object of my invention is to provide a refrigerator for domestic use having food storage compartments below and above freezing temperatures embodied in a single tiltable unit and so constructed that the higher temperature food storage container is maintained at all times in a substantially upright position notwithstanding the tilting of the unit, thus avoiding possible spilling of milk and other fluids which may be stored in the higher temperature container.

A further object is to provide a refrigerator of the above indicated character which can be manufactured to sell at a relatively low price without sacrifice of quality.

When the present invention is embodied in a structure wherein the food storage unit is arranged to be tilted bodily for gaining access thereto, it is desirable to maintain the second or upper food container constantly in an upright position, or nearly so, in order to avoid spilling milk and other fluids likely to be stored therein; and I have devised some novel mechanisms which are hereinafter described and which are effective to that end. These constitute further features of my invention.

The foregoing and other objects and advantages of the invention will be apparent from the following description and the accompanying drawings in which similar characters of reference indicate similar parts through out the several views.

Referring to the drawings, of which there are three sheets:

Fig. 1 is a vertical sectional view of a refrigerator illustrating means for maintaining the upper food container in upright posture when the refrigerator unit is tilted forwardly;

Fig. 2 is a side elevational view of the same refrigerator showing the food storage unit in its open or forwardly tilted position;

Fig. 3 is a frontal half view with the food storage unit open; and

Fig. 4 is a sectional view taken along the irregular line 4—4 of Fig. 1.

The structure of the refrigerator depicted for exemplary purposes in Figs. 1 to 4 comprises a formed sheet metal housing or cabinet 10, including side walls 11 and 12 and a top 13 which may be either removable from the side walls or fixedly connected thereto. The top and side walls are joined at 14. The back of the housing consists preferably of a formed sheet metal X-brace 15 which may be either integral with or otherwise secured to the side walls, as by welding. The housing is generally rectangular in shape and open at the front except along the top border margin which is constituted by the front face of the top 13. The side walls are interconnected at the bottom by a floor plate 16 on which is mounted a compressor unit 17 and a condenser unit 17a. The whole structure is preferably mounted on casters 18 which are suitably attached to the housing.

Mounted within the housing is a generally rectangular food storage refrigeration unit 19 made of sheet metal inner and outer wall plates 20 and 21 and inner and outer bottom plates 22 and 23. The space between the inner and outer plates is filled with a suitable thermal insulating material 24. The inner wall plates and inner bottom plate define a rectangular chamber 25 which constitutes a low temperature compartment which is open at the top for access, and the low temperature therein is maintained by a surrounding evaporator coil 26 extending the full height of the rectangular chamber and which is connected to the condenser and compressor by flexible connections to provide the usual circulation of refrigerant.

Extending downwardly from the main body of unit 19 and forming integral parts of the unit are a pair of plates 27. These are connected to either side of the main body and pivotally connected at 28 to a pair of shouldered cap screws 29. Plates 27 are cut obliquely along line 27a to permit unit 19 to be tilted forwardly as depicted in Fig. 2. The rear lower edges 27b of plates 27 extend horizontally when the unit is upright, as illustrated in Fig. 1, and they serve to limit the backward or inward movement of the unit. The space 30 underneath unit 19 is closed at the front by a closure plate 31 which is hinged at 32 and held at its upper edge closely adjacent the front face of the unit by a spring (not shown), which permits the closure plate to rotate on its hinge when the unit is tilted. Plate 31 is provided with louver openings 34 to admit air to space 30, although such louvers may be unnecessary if the bottom of the housing is left open sufficiently to permit a free circulation of air over the radiating surface of the condenser. Rollers 35 carried by closure plate 31 bear against the front of the unit and serve to hold the upper edge of the closure in spaced relation to the unit so that it will not scrape thereon when the unit is tilted.

A recess 36 is formed in the upper front face of unit 19 to provide a manual grip for tilting the unit outwardly, and this is finished off with an escutcheon plate 37.

In my previously mentioned copending application, I have illustrated and described suitable spring means for aiding in the return of the unit to its upright position, and dashpot means effective to cushion the return movements of the unit. Those adjuncts are applicable to the structure now being described, but they have been omitted here in order to simplify the disclosure. Reference may be had to said copending application for details concerning said spring and dashpot means; but it is to be observed that those features are not essential to the operation of the present structure and are in no way directly related to the subject matter herein claimed, although it is desirable that similar provisions be added.

Suspended from the top inner edge of unit 19 and nested in the upper portion of the low temperature compartment 25 is a basket-like container 38 made preferably of a material having good thermal insulation properties as, for example, a phenol fiber plastic or hard rubber. The interior of this container is intended to be maintained at a temperature well above 32° F. and is designed to receive food-stuffs which are to be preserved but not frozen. A gasket 39 of special design and made of a resilient material such as soft rubber or a synthetic rubber-like material is firmly attached all around to the upper edge of container 38 and has an outwardly extending flange by means of which said container is suspended on the upper inside edge of unit 19.

The open upper end of unit 19 is thermally sealed when in closed position by a cover 42 which preferably comprises a sheet metal shell filled with thermal insulating material. A pair of continuous gaskets 43, 43 are attached to the under side of cover 42 and interposed between said cover and the top face of unit 19; and downward pressure is brought to bear upon said cover and against said gaskets by means of several coil springs 44, the upper ends of which bear against the under surface of top 13. The gaskets 43, 43 serve as a secondary seal when the container 38 is used, since the cover also seals against the gasket 39 thereon. Springs 44 serve to maintain a tight joint between the cover and the top of unit 19 and between the cover and gasket 39 while at the same time enabling the cover to rise to a limited extent in order to clear the unit when it is tilted from closed to open position and upon restoration to closed position.

When, from time to time, which is infrequent in normal use, it is necessary to obtain access to the low temperature compartment, container 38 is lifted out and may be placed on the flat upper surface of top 13 or in any other convenient place.

For the purpose of lifting cover 42 sufficiently to clear the top of unit 19 when the latter is being tilted from the closed to the open position, and again during restoration to the closed position, there are provided two rear rollers 52, 53 and two forward rollers 54, 55. The two rear rollers, 52, 53, are carried by unit 19 near the two upper rear corners, and only the upper surfaces of their peripheries are disposed above the body of the unit while it is being tilted. Said rollers 52, 53 press upwardly thus raising the cover when the unit is tilted forwardly and also during the return movement thereof.

Front rollers 54 and 55 are carried by cover 42, and they project downwardly therefrom so as initially to engage the adjacent top surface of unit 19 to break the gasket seal, and then to roll along the upper side faces of gasket 39 to prevent that gasket from contacting the lower edge of the top 13 during the forward and backward movements of said unit. They normally extend into recesses (not shown) so that they clear the top of the unit, when closed, and thus permit the forward portion of the cover to bear down firmly on gaskets 43. As unit 19 is tilted forwardly, front rollers 54 and 55 initially ride out of the recesses onto the top surface of the unit and momentarily lift the front portion of the cover. This occurs simultaneously with the lifting of the rear portion of the cover by rollers 52, 53. During continued movement of the unit 19, the cover is lifted by the rear rollers so as to clear the unit and is additionally supported by side flanges 14.

Cover 42 is not hinged but is held in its proper position laterally by housing top 13, and, in order to prevent undue friction between said cover and the housing top—which friction might otherwise cause the cover to bind and thus move up and down only with difficulty, or not at all—I have attached to the four edges of the cover eight ball bearings 60 which are adapted to roll in their sockets if and when they come into contact with the adjacent inside surfaces of housing top 13. By virtue of this provision, the cover will rise and fall freely notwithstanding contact with top 13. To facilitate installation and removal of the cover, a removable plate 13b comprises part of the top and is held in place by fastening means such as screws.

When unit 19 is in the open position, as shown in Fig. 7, the rear portions of the side edges of cover 42 rest on the side flanges 13a which are an integral part of housing top 13.

A pair of long rods 79 and 80 are pivotally mounted at their lower ends in cups 81 secured to the base of the housing. Said rods extend upwardly at an acute angle to the vertical through openings 82 formed in the two side walls of unit 19; and the upper ends of said rods are each adapted to engage, pivotally, angle brackets 83, 84 attached, respectively, to the two sides of container 38, as shown in Figs. 3 and 4.

As clearly depicted in Fig. 1, rods 79 and 80 do not quite engage the respective brackets 83, 84 when the unit is upright; but as said unit is tilted forwardly, the container dips slightly at its forward end until the brackets rest on the ends of the rods. As portrayed in Fig. 2, container 38 is slightly tilted when the unit is open, but not enough to cause spilling of fluid contents. The reason the rods are made too short to engage the brackets when the unit is upright is that otherwise the front edge of gasket 39 would be lifted to such an extent during the opening movement as to require an inconveniently large vertical movement of cover 42 to effect clearance; and although this would result in avoiding the slight tilt of container 38 depicted in Fig. 2, the advantages, if any, in so doing would not usually offset the disadvantage of having to lift the cover the additional amount required. However, it is not to be supposed that I intend to limit the scope of my invention as respects this feature to an arrangement wherein the rods fall short of engaging the brackets when the refrigeration unit is closed.

The two openings 82 should be made large enough to permit some canting of rods 79 and 80 with respect thereto as the unit is tilted, but it has been found that remarkably little clearance is needed because with the layout shown, the longitudinal axis of each of the two openings passes very nearly through the pivotal center at the lower ends of the rods at every position of the unit between the two extremities of its movement.

A pair of coil springs 85 and 86 are mounted, respectively, on the two rods 79, 80 and press upwardly on the front edge portion of unit 19. These serve to bias the unit toward closed position, and they are long enough to permit the unit to tilt forwardly to the desired extent, as shown in Fig. 2; and they exert their maximum force on the unit when the maximum force is needed. Suitable dashpots preferably should be provided to cushion the return movements of the unit; but since these are adequately shown and described in my above identified copending application, I have omitted to show them in this case.

While I have illustrated and described a preferred embodiment of my invention, it is to be understood that many modifications can be made without departing from the spirit thereof, and, accordingly, I do not wish to be limited except as clearly indicated by the language of the appended claims.

Having thus described my invention and its mode of operation, what I claim as new and wish to secure by Letters Patent of the United States, is:

1. The combination in a refrigerator, of a base, a unit pivoted at the bottom on said base for tilting in a vertical plane from a vertical closed position to an angular open position, said unit having a low temperature compartment which is open at the top, a food storage container nested in the top of said compartment and removably supported at its upper edges by said unit, and a rod pivotally supported at one end on said base and projecting upwardly, the upper end of said rod being operative to support the front portion of said container during the tilting of said unit and while said unit is in its open tilted position, whereby to maintain said container at least approximately in upright position when the unit is open and during the tilting thereof.

2. The combination in a refrigerator, of a base, a unit pivoted at the bottom on said base for tilting from a vertical closed position to an angular open position and vice versa, said unit having a low temperature compartment which is open at the top, a food storage container nested in the top of said compartment and removably supported at its upper edges by said unit, and a pair of rods each pivotally supported at one end on said base and projecting upwardly through openings in the side walls of said unit, the upper ends of said rods being adapted to engage and support the front portion of said container during the tilting of said unit, the rear edge of said container being supported by said unit when the unit is tilted, the arrangement being such that said container is maintained at all times in approximately upright position.

3. The combination in a refrigerator, of a base, a heat insulated housing pivoted at the bottom on said base for tilting from a vertical closed position to an angular open position and vice versa, said housing having a low temperature compartment which is open at the top, a food storage container nested in the top of said compartment and removably supported at its upper edges by said housing, and a pair of rods each pivotally supported at one end on said base and projecting upwardly through openings in the respective side walls of said housing, the stance of said rods being at an acute angle to the vertical when said housing is closed, and at an acute angle to the opposite side of the vertical when the housing is open, said rods being adapted to engage the forward portion of said container at their upper ends but too short to effect such engagement when the housing is in closed position, being long enough, however, to engage the container during the tilting of the housing to open position and thereby to support the front portion of the container while the housing is open, the rear edge of the container being continuously supported by the housing, the arrangement being such that said container is maintained at all times in an approximately upright position notwithstanding the tilting of the housing.

References Cited in the file of this patent

UNITED STATES PATENTS

| Number | Name | Date |
| --- | --- | --- |
| 711,705 | Keen et al. | Oct. 21, 1902 |
| 806,277 | McKee | Dec. 5, 1905 |
| 812,343 | Horner | Feb. 13, 1906 |
| 1,229,100 | Lents et al. | June 5, 1917 |
| 1,455,974 | Solon | May 22, 1923 |
| 1,585,574 | Thompson | May 18, 1926 |
| 2,444,125 | Wheeler | June 29, 1948 |
| 2,490,535 | Minor | Dec. 6, 1949 |
| 2,537,669 | Honig | Jan. 9, 1951 |

FOREIGN PATENTS

| Number | Country | Date |
| --- | --- | --- |
| 355,420 | Germany | June 27, 1922 |